United States Patent [19]

Crowley

[11] Patent Number: 5,630,780

[45] Date of Patent: May 20, 1997

[54] METHOD AND APPARATUS FOR BUSINESS FORMS

[75] Inventor: H. W. Crowley, Newton, Mass.

[73] Assignee: Roll Systems, Inc., Burlington, Mass.

[21] Appl. No.: 402,517

[22] Filed: Mar. 10, 1995

Related U.S. Application Data

[62] Division of Ser. No. 172,545, Dec. 23, 1993, Pat. No. 5,399,143, which is a division of Ser. No. 832,097, Feb. 6, 1992, Pat. No. 5,273,516.

[51] Int. Cl.$^6$ ........................................ B65H 29/00
[52] U.S. Cl. .................. 493/416; 414/373; 414/789.2; 414/790.5; 108/1; 211/49.1
[58] Field of Search .................... 493/405–416, 493/357–360, 436; 414/789.2, 789.3, 789.4, 789.8, 790.4, 790.6, 790.5, 373; 211/49.1, 50–53; 271/149, 151–153; 108/1, 6, 12, 13

[56] References Cited

U.S. PATENT DOCUMENTS

| | | |
|---|---|---|
| 3,851,773 | 12/1974 | Kluge . |
| 3,883,131 | 5/1975 | Anderson, Jr. et al. . |
| 3,887,088 | 6/1975 | Fernandez-Rana . |
| 3,974,921 | 8/1976 | Tokuno . |
| 4,103,786 | 8/1978 | Tokuno ........................................ 214/7 |
| 4,197,045 | 4/1980 | Stauber . |
| 4,429,889 | 2/1984 | Westra ........................................ 280/79.1 |
| 5,061,233 | 10/1991 | Schultz ........................................ 493/410 |
| 5,399,143 | 3/1995 | Crowley . |

OTHER PUBLICATIONS

Wallace Computer Services, Inc., "Printed Forms Transport" sales flyer, Oct. 1992.
Wallace Computer Services, Inc., "LaserMax System: Moveable Conveyor Cart" sales flyer.

Primary Examiner—Jack W. Lavinder
Attorney, Agent, or Firm—Cesari and McKenna, LLP; William A. Loginov, Esq.

[57] ABSTRACT

A system for stacking continuous folded forms coming from a folder and moving to a conveyor. A table is position adjacent and in line with the conveyor and in a position for receiving a horizontal stack of folded forms disposed on the table top. The table is a tiltable table and is able to be tilted from a substantially horizontal position to a substantially vertical position to likewise move the stack from a horizontal to a vertical stack position. A cart is movable to a position adjacent to the tilted table for receiving from the table the vertical stack for support on the cart.

9 Claims, 5 Drawing Sheets

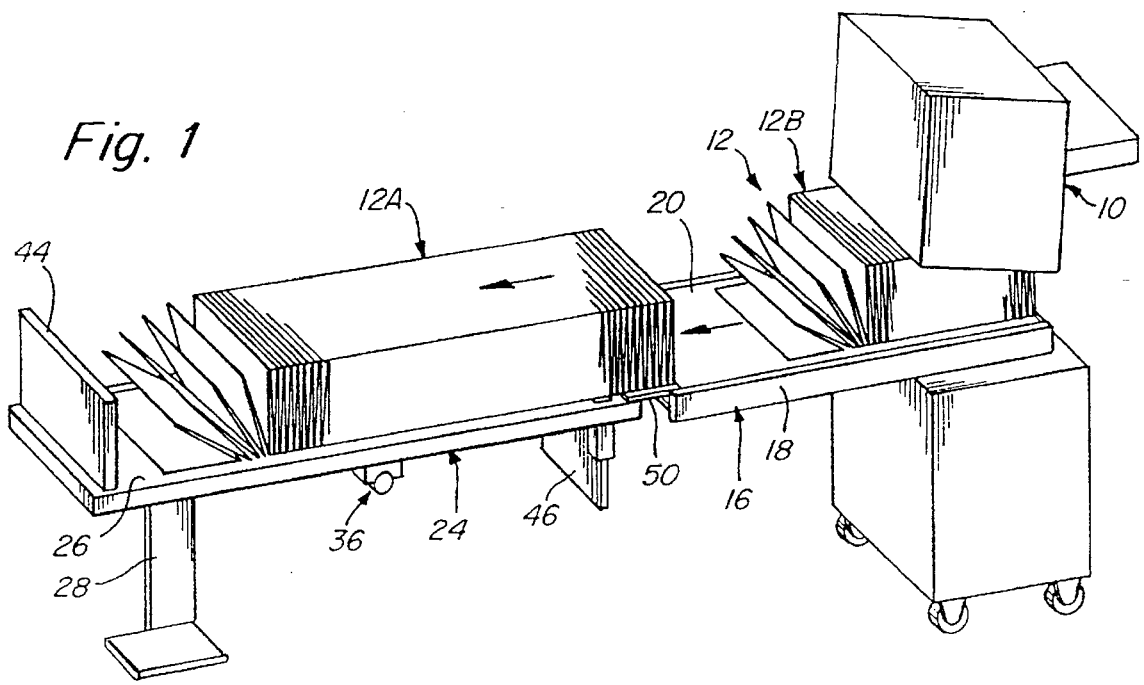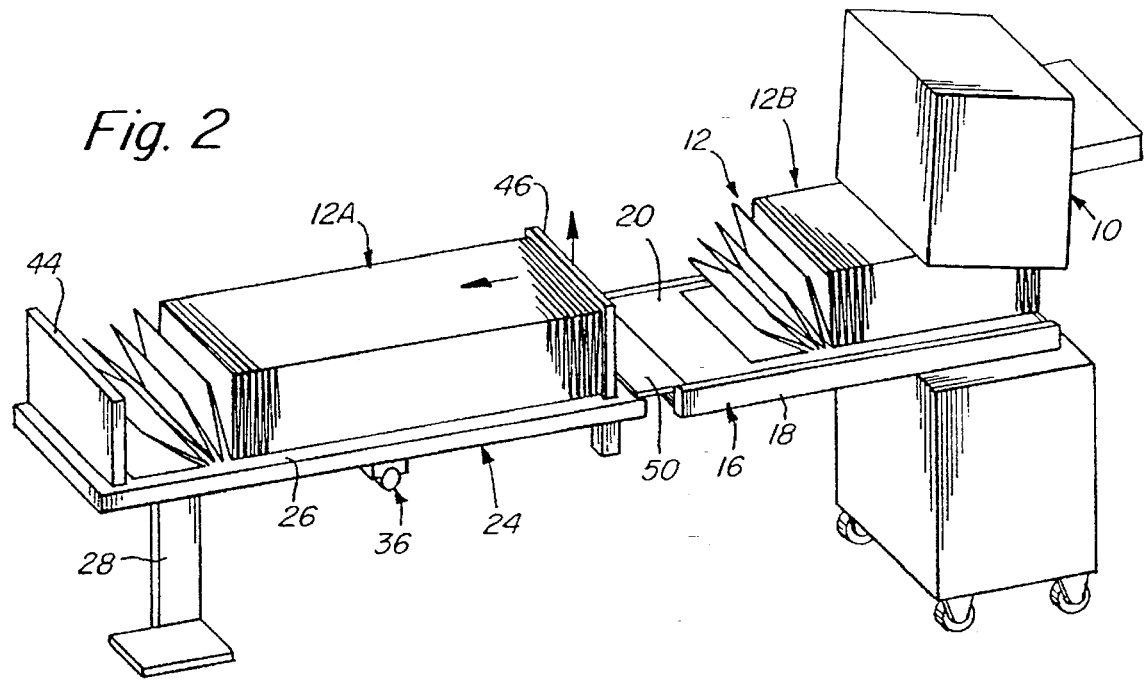

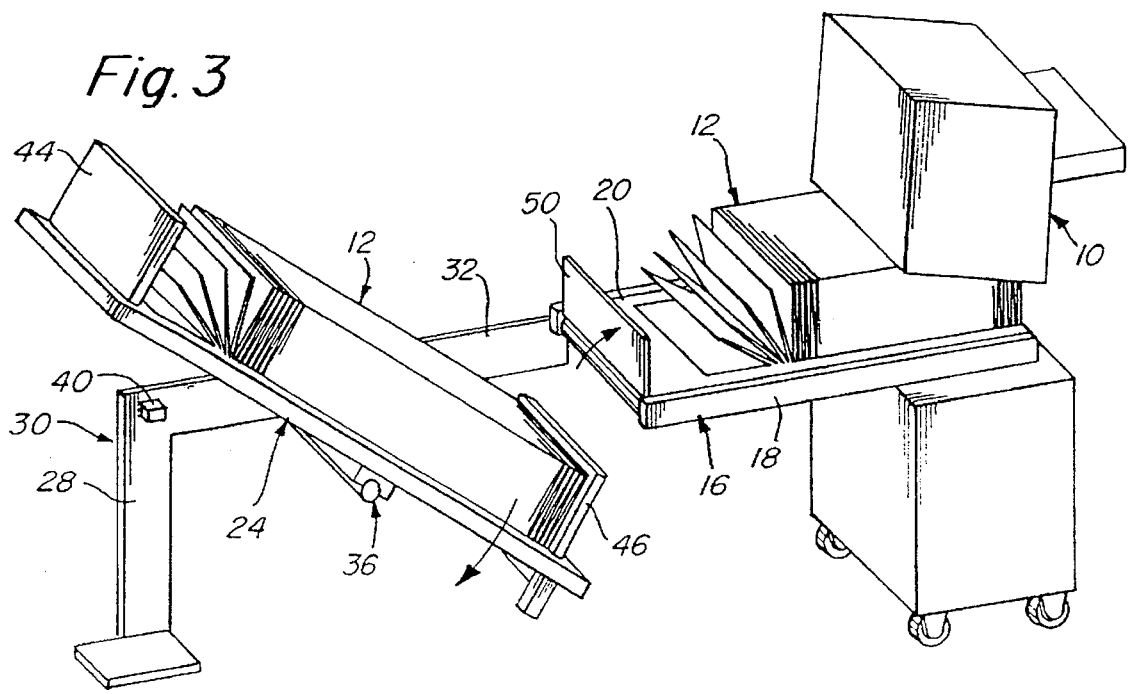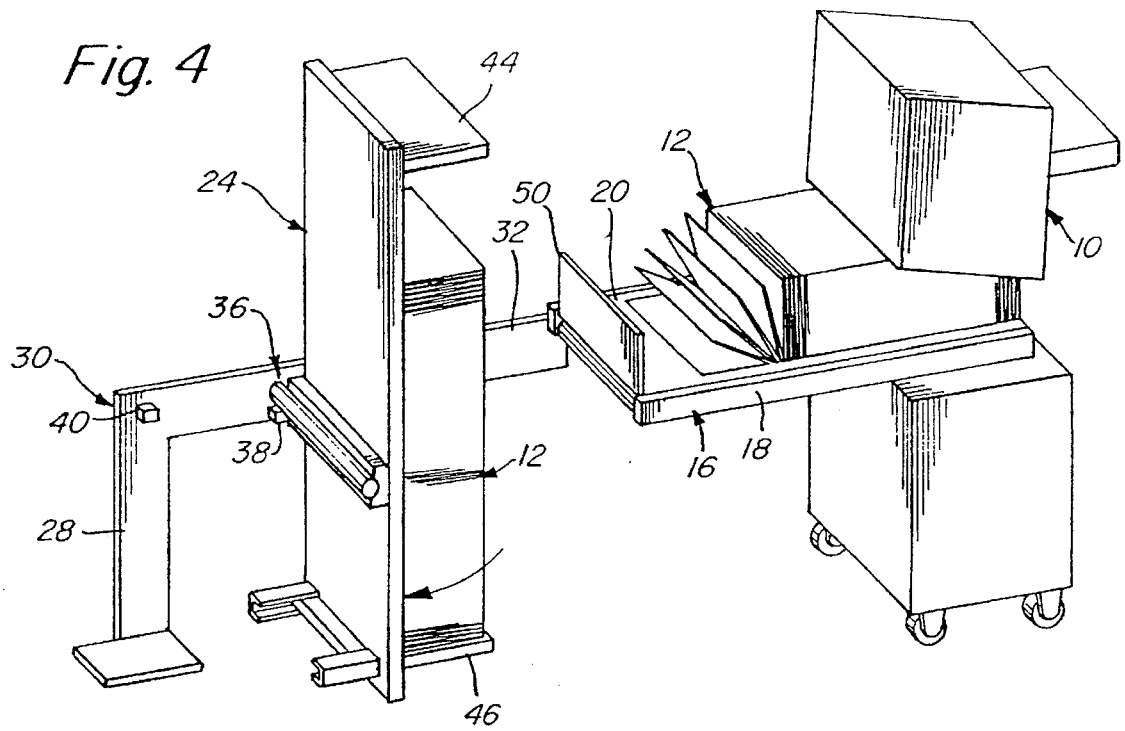

METHOD AND APPARATUS FOR BUSINESS FORMS

This application is a division of application Ser. No. 08/172,545 filed on Dec. 23, 1993, now U.S. Pat. No. 5,399,143 which in turn is a division of application Ser. No. 07/832,097 filed on Feb. 6, 1992, now U.S. Pat. No. 5,273,516.

BACKGROUND OF THE INVENTION

The present invention relates in general to a method and apparatus for the processing of business forms. More particularly, the present invention relates to a system for stacking continuous folded forms. Even more particularly, the present invention relates to a unique combination of elements used in such a system employing a tiltable table in combination with a stack cart or stack rack.

There are various ways of processing folded forms particularly between an initial folding operation and subsequent finish operations. However, existing transfer systems tend to be rather complex in construction and have rather limited capacity.

It is an object of the present invention to provide a forms transfer system that has an improved capacity and in particular in which a stack rack is used having a capacity of 50,000 forms or more.

Another object of the present invention is to provide an improved system for stacking continuous folded forms in which there is far less frequent intervention by an operator. In accordance with the present invention there is a minimizing of handing of the forms thus minimizing maintenance problems associated with the system.

Still another object of the present invention is to provide a cart system in which the cart is far more space efficient than prior carts. In accordance with the present invention for a particular square footage of coverage of the cart there is a forms capacity far in excess of that previously obtainable.

Another object of the present invention is to provide an improved system for stacking continuous folded forms and associated improved stack rack or stack cart that is relatively inexpensive, of relatively simple construction and one requiring minimal maintenance. Still another object of the present invention is to provide an improved storage cart for folded forms and one in which it is readily adapted for use with utilization equipment such as feed inserting equipment.

SUMMARY OF THE INVENTION

To accomplish the foregoing and other objects, features, and advantages of the invention there is provided in accordance with the present invention a system for stacking continuous folded forms. The system of the present invention is characterized by simplicity, versatility, flexibility, cost, cost effectiveness, and space efficiency. The system employs a unique combination of elements that enables folded forms to be conveyed, accepted on a tiltable table and then readily transferred to a stack rack or stack cart.

In accordance with the present invention the system may be considered as comprising a folder for folding the forms along fold lines, a conveyor and means for positioning the conveyor adjacent the folder so that the folded forms from the folder are received on and moved along the conveyor. A table is provided having a table top support surface. The table is positioned adjacent and in line with the conveyor and in a position for receiving a horizontal stack of folded forms that are moved by the conveyor and positioned on the table top support surface. In accordance with the embodiment disclosed herein, a flap may bridge between the conveyor and the table which flap is maintained flush with the top surfaces of the conveyor and the table so that the forms pass readily from the conveyor onto the table.

The system of the present invention also provides means for enabling tilting of the table from a substantially horizontal position to a substantially vertical position to in turn move the stack from a horizontally disposed stack to a vertically disposed stack. In the embodiment disclosed herein, associated with the table is a end wall at the end of the table remote from the conveyor and a sliding door at the end of the table adjacent to the conveyor. The sliding door, when the table is in a horizontal position may be disposed depending downwardly but may be moved to an upward position to in essence form an opposite end wall for retaining a stack of folded forms on the table between these end walls. The sliding doors, once the stack is moved to a vertical position functions as resting surface for the stack.

Moreover, in accordance with the system of the present invention there is provided a stack rack or a stack cart. This is movable such as by means of wheels or casters on it and is compartmentalized so as to receive preferably a plurality of these vertical stacks. For this purpose the stack cart is movable to a position adjacent the tilted table, once tilted, for receiving from the table the vertical stack for support on the cart.

In the embodiment of the invention disclosed herein, the cart has a bottom resting surface and vertically disposed walls preferably defining four separate compartments for accommodating vertical stacks. Each of these compartments may also be provided with one or more shelves so as to accommodate stacks of different height. As also indicated previously, the cart is readily rotatable so that once one stack has been loaded the cart can be easily rotated to receive a further stack from the table once the table receives the stack and is tilted.

BRIEF DESCRIPTION OF THE DRAWINGS

FIG. 1 is a perspective view illustrating a portion of the system of the present invention illustrating a new run coming out of the folder and moving forward on the conveyor as well as a run that is almost totally disposed on the table;

FIG. 2 is a perspective view similar to that shown in FIG. 1 but now illustrating a next step in which the sliding door is moved into position for retaining the stack on the table;

FIG. 3 is a perspective view showing the flap on the conveyor flipped up and with the table being partially tilted;

FIG. 4 is a perspective showing the table now completely tilted to a vertical position;

DETAILED DESCRIPTION

The drawings in this application illustrate a preferred embodiment for a novel system for stacking continuous folded forms. The system basically employs at least two main elements, one being a table that is adapted to receive forms from a conveyor, and which table is tiltable; and a stack rack or stack cart that is adapted to receive preferably multiple stacks from the table.

FIGS. 1–7 herein are perspective views that illustrate the sequences of events that occur in connection with the use of the apparatus and method of the present invention. Generally speaking, FIG. 1 shows a finished run that is almost completely disposed on the tilt table and a new run coming out of the folder and moving forward on the conveyor. The run that is on the table has just passed off of the conveyor and will then stop moving.

FIG. 2 shows the run shoved over enough to allow the sliding door to come up against the last sheet. This sliding door operation can be carried out manually or some type of automatic system could be employed.

Figure 5:
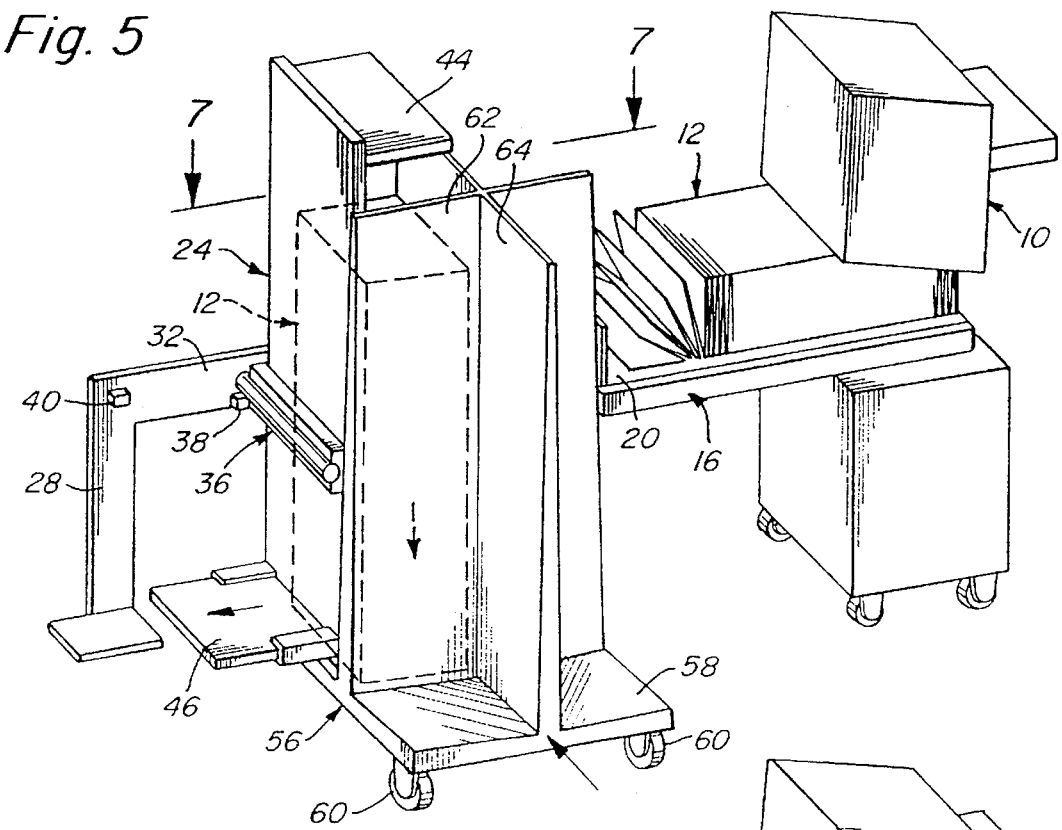
FIG. 5 is a perspective view illustrating the table substantially in the position of FIG. 4 but with the door withdrawn as illustrated after the stack cart has been moved into position.
Figure 6:
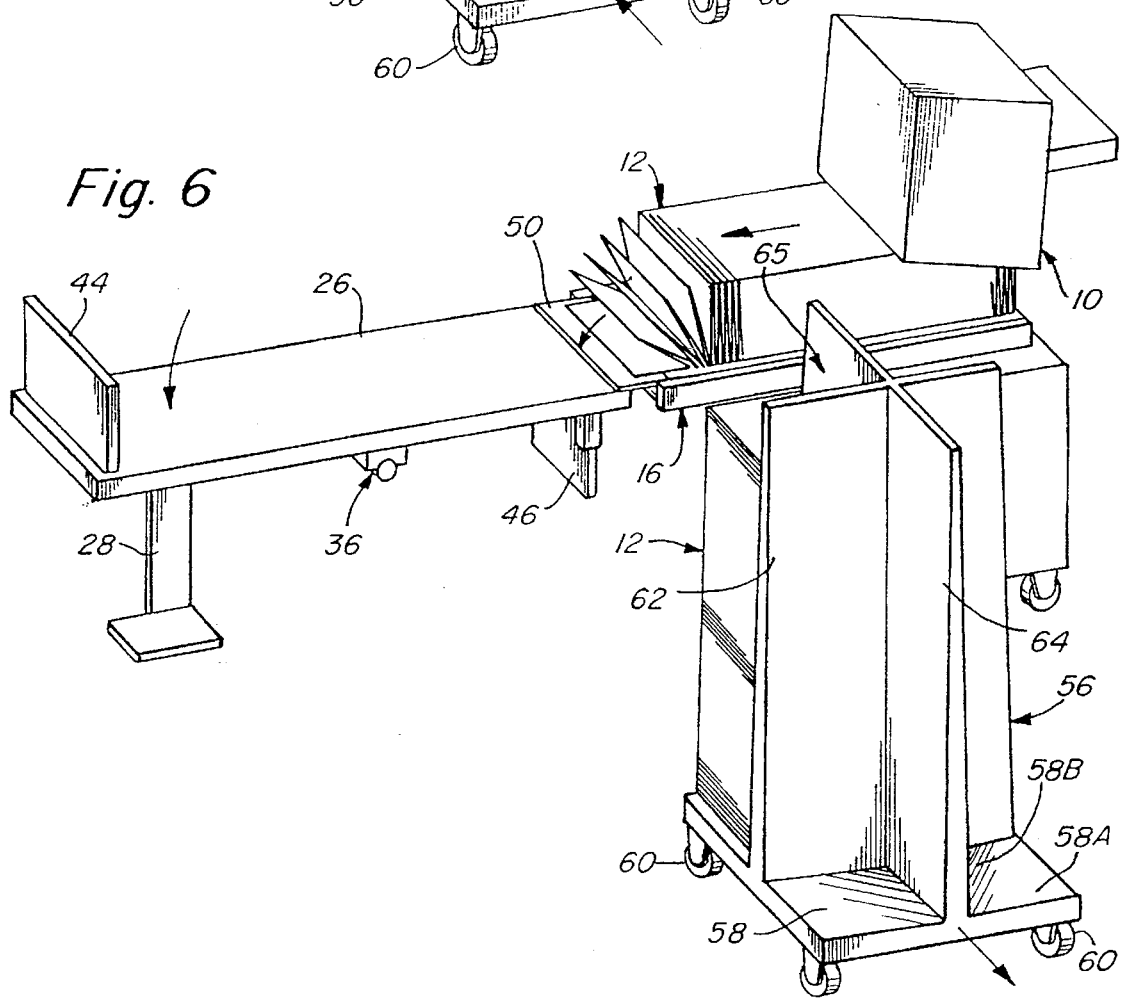
FIG. 6 is a perspective view illustrating the table being moved back to it horizontal position with the flap engaged between the conveyor and the table and with a new group of forms now being conveyed onto the table.
Figure 8:
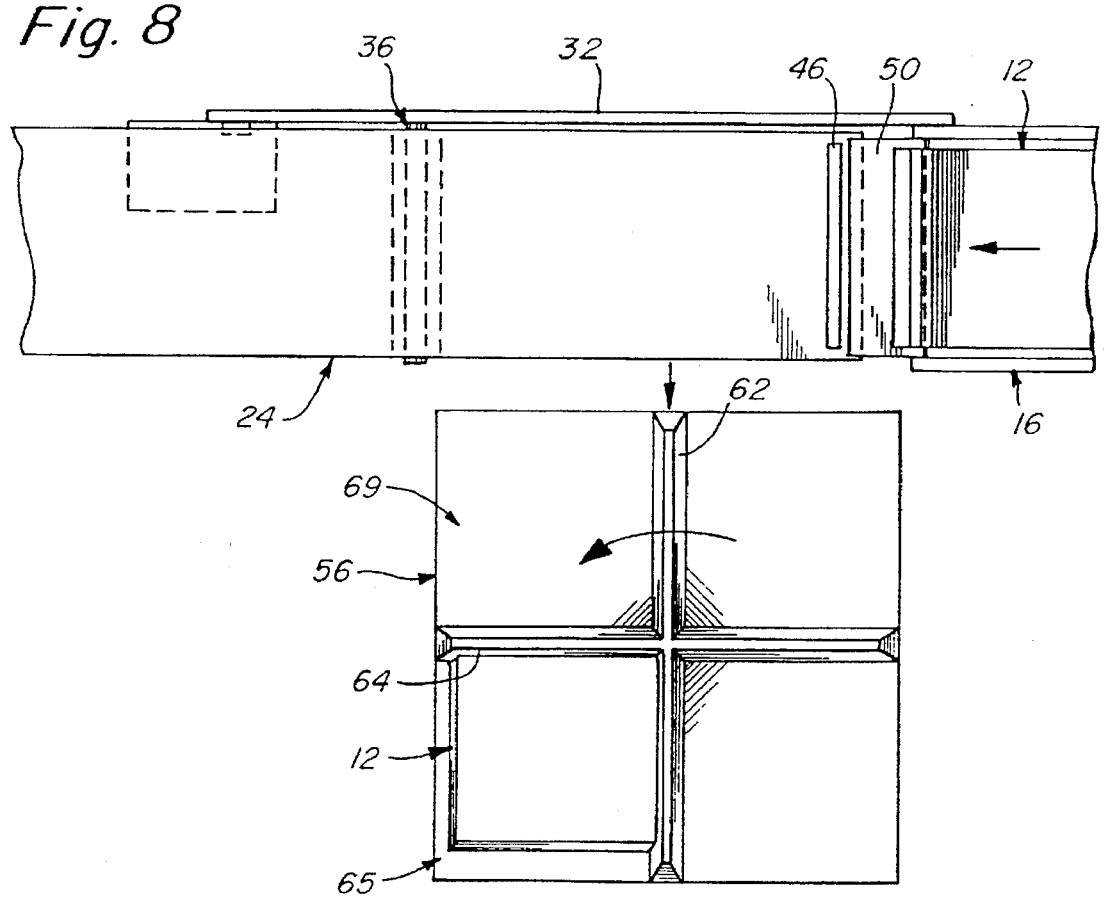
FIG. 8 is a top plan view showing the rack pulled out an rotated with another empty bay ready for the next run which is passing over the flap and about to pass over the end of the sliding door which is now flush with the surface of the tilt table.

FIGS. 2–5 show the new run slowly progressing out of the folder. FIG. 3 shows the stack partially tilted while FIG. 4 shows the stack in its fully tilted vertical position. FIG. 5 shows the cart engaging with the stack and FIG. 6 shows the cart after having received the stack being moved away so that it can be rotated such as is illustrated in FIG. 8.

With more particular reference to the structure illustrated in the drawings, there is provided a folder 10 that folds the forms into the folded form illustrated in the drawings. The folded forms are shown at 12.

Associated with the folder 10 is a conveyor 16 which may have fixed side walls 18 and a conveying belt 20. The conveyor 16 conveys the forms 12 therealong. In FIG. 1 there is actually illustrated a first stack 12A that has already progressed to the tilt table 24 and a stack 12B that is still progressing along the conveyor 16.

The tilt table 24 has a table top support surface 26 and in the embodiment illustrated herein is comprised of only a single leg 28 although the table could be supported by more than one leg. As illustrated in FIGS. 3 and 4 there is a support bracket 30 that has leg 28 as one member and a further support leg 32 that may fasten to a side of the conveyor 16.

As has been indicated previously, the table 24 is a tiltable table and for this purpose there is provided at the bottom of the table flat surface a pivot mechanism 36 illustrated perhaps best in FIG. 4. This pivot mechanism is supported from the leg 32 of the bracket 30.

Associated with the table are stops. There is a stop 38 illustrated in FIG. 4 that controls the vertical position of the table. There is also a stop 40 illustrated in FIG. 4 that controls the horizontal position of the table 24.

At an end of the table surface 26 remote from the conveyor there is provided an upright end wall 44. This may be permanently fixed in position and simply prevents the stack from falling off that end of the table. The tilt table may also have side walls extending the longitudinal length thereof. Such side walls are not illustrated in the drawings herein.

At the end of the table surface 26 close to the conveyor 16 there is provided a sliding door 46. The door 46 may have detent positions associated therewith so that it can be slid but held in alternate positions. In this regard, in FIG. 1 the door 46 is shown depending downwardly so that the top surface thereof, such as illustrated in FIG. 8, is essentially flush with the table surface 26. In this way, the sliding door is not at all interfering with the progress of the stack 12A as it is moved from the conveyor onto the tilt table. FIG. 2 on the other hand shows the door 46 moved to its upper position whereby detent means or the like it can be retained in that position.

FIGS. 1 and 2 also illustrate a flap 50 that is adapted to bridge between the conveyor 16 and the table 24. The flap 50 is pivotal between a position such as that illustrated in FIG. 2 and that illustrated in FIG. 3. In the position of FIG. 2 the flap 50 has its top surface flush with the top of the conveyor surface namely surface 20 and the top of the table or surface 26. In this way, forms that progress along the conveyor are not at all impeded by the flap but simply pass over the flap.

The flap 50 may also also be moved to an upright position as illustrated in FIGS. 3 and 4. In its uprights position the flap 50 may prevent the forms on the conveyor 16 from progressing any further than the position of the flap.

In FIG. 1 the stack 12A has progressed to a point where the conveyor is no longer moving it. The rear end of the stack overlies the flap 50. The sliding door 46 is in its downward position. The front end of the stack may be against the wall 44 or spaced from it as illustrated in FIG. 1.

After the position of FIG. 1, in FIG. 2 the operator may move the stack 12A to the left as illustrated by the arrow and the door 46 is then moved upwardly as also illustrated by the arrow. The door 46 now functions as an opposite end wall so to speak and when the table 24 is tilted it will be seen that the door 46 functions as a base rest surface for the stack 12A. In FIG. 2 the flap 50 is still in its horizontal position.

FIG. 3 now illustrates the flap 50 moved upwardly so as to prevent any further forms from progressing off of the conveyor. Also, in FIG. 3 the table 24 is shown being partially tilted. In FIG. 4 the table has been tilted to its full vertical position whereby the associated stack 12 supported on the table is also in a vertical stack. Note in both FIGS. 3 and 4 that the door 46 is in a position where it functions as a resting surface for the bottom of the stack. In FIGS. 3 and 4 the flap 50 is also maintained in its upright vertical position.

With regard to FIGS. 3 and 4 it is noted that the table 24 is illustrated as being rotated clockwise. Similarly, the table can be rotated counterclockwise. In other words, the table can pivot in either direction. If the table is pivoted in a counterclockwise direction then the endwall 44 functions as a rest surface for the bottom of the stack.

Figure 7:
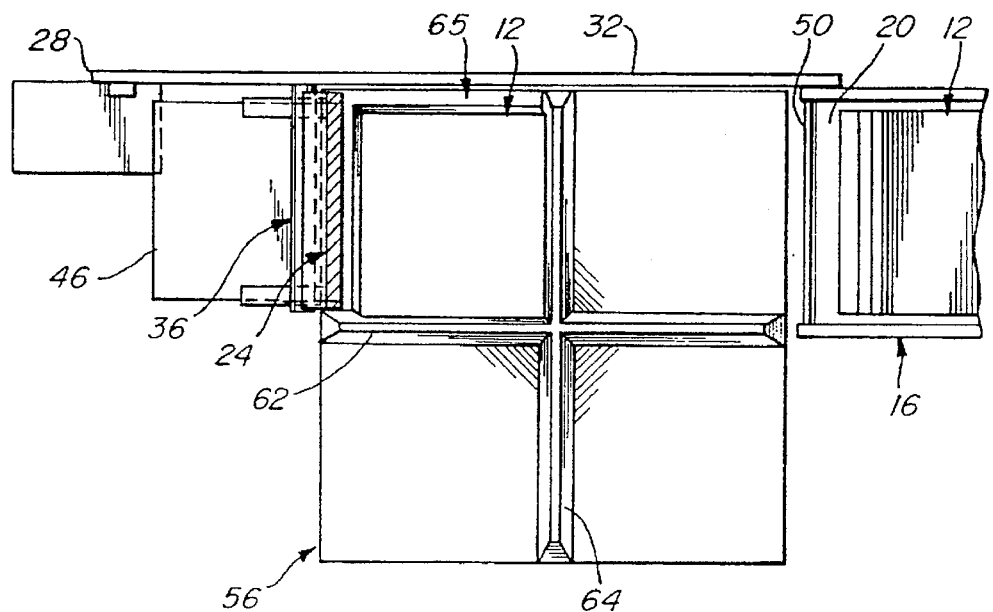
FIG. 7 is a cross sectional view taken along line 7—7 of FIG. 5.

FIG. 5 illustrates the tilt table 24 in the same position as in FIG. 4. The stack 12 is shown in dotted outline. However, FIG. 5 also illustrates the stack rack or stack cart 56 of the present invention. The cart 56 has a base 58 that is supported by four rollers or casters 60. Supported from the base 58 are crossed walls 62 and 64 which define four separate vertically disposed compartment as clearly illustrated in FIGS. 5 and 6. These compartments are also illustrated in FIGS. 7 and 8 such as the compartment 65 that receives the stack 12.

The walls 62 and 64 may be tapered slightly such as illustrated in FIGS. 5 and 6 or they may be straight vertical walls extending from the base. The base 58 in each compartment is preferably tilted such as from a front edge 58A slightly downwardly to a more rear edge 58B (see FIG. 6). This tilting of the base of the cart toward the center assists in holding the stacks in a more stable postion on the rack.

FIG. 5 illustrates the cart 56 having been moved into position. The base 58 of the cart is positioned essentially under the sliding door 46 so that there is no interference between the cart and the table 24. It is noted in FIG. 5 that for example, the wall 62 of the cart engages the side of the table as the table is in its vertical position. The door 46 is then slid in the direction of the arrow so as to disengage from the bottom of the stack 12. The stack 12 is then resting upon the base 58 of the cart 56.

The cart 56 may then be moved away from the table such as to the position of FIG. 6. FIG. 6 also illustrates the table being moved in the direction of the arrow in FIG. 6 so that the table is now again in a horizontal position and is ready for the receipt of a further stack. Note in FIG. 6 that the flap 50 is moved downwardly so that the conveyor can now operate to move the next stack onto the table 24.

Thus, in FIG. 6 the cart is shown with only a single stack on it and in a position moved away from the tilt table. FIG. 7 is a cross sectional view taken along line 7—7 of FIG. 5 and thus illustrates the position in a plan view of the cart relative to the tilted table. FIG. 8 illustrates the cart 56 now rotated in the direction of the arrow so that a new compartment 69 may be moved into position to receive a subsequent stack off of the tilt table.

Figure 9:
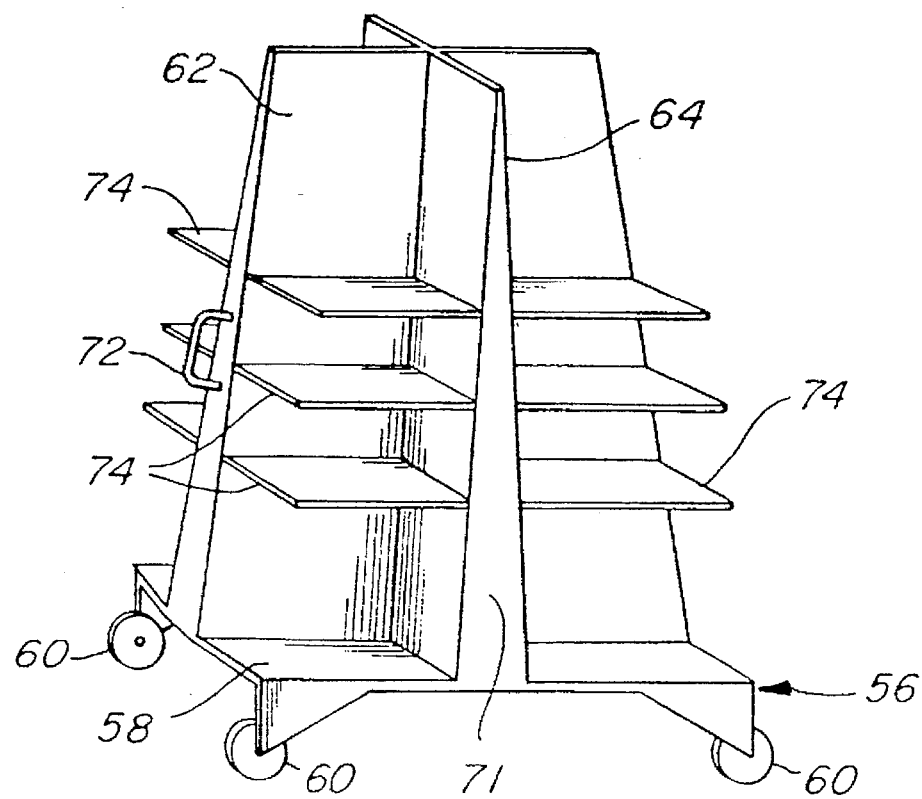
FIG. 9 is a prespective view of an alternate stack cart construction employing removable shelves associated with each compartment.

Reference is also now made to FIG. 9 for an alternate embodiment of the stack rack of the present invention. Once again, this rack is usable to move fan folded or cut-sheet stacks easily and conveniently to the next stop in the output handling sequence. In the embodiment of FIG. 9 the same reference characters are used to identify basically the same components illustrated in the prior figures. However, in the embodiment of FIG. 9 there are twelve removable shelves 74 as well as four fixed base shelves 58. These removable shelves in particular allow varying height stacks to be accommodated on the cart. The cart in accordance with the present invention has a substantially large capacity. It can stock as much as five hours or more of production or, for example, up to 100,000 16-pound 18.5×12 inch pages. This cart occupies in one embodiment approximately only 6.9 square feet. In addition to the casters 60 that are employed it also preferably has at least one handle 72. All of the shelves that are employed are preferably slanted inwardly so as to keep the stacks square. The cart is made of solid, rugged construction. It is preferably made of a heavy gauge welded steel.

Also noted in FIG. 9 is that the walls are preferably tapered such as illustrated at 71 so as to again provide for more stability in holding the stacks of folded or cut-sheet material.

In the foregoing description, reference has been made primarily to the use of the present invention as it pertains to business forms and in particular folded forms. However, the concepts of the present invention may also be employed in connection with the proceessing of cut sheets.

Having now described a limited number of embodiments of the present invention, numerous other embodiments and modifications thereof are contemplated as falling within the scope of the present invention as defined by the appended claims.

What is claimed is:

1. A system for stacking materials comprising a conveyor for the materials, a table having a tabletop support surface, the table being positioned adjacent to the conveyor in a position for receiving a substantially horizontal stack of the material from the conveyor, the table having a pivot structure that enables tilting of the table from a substantially horizontal position to a substantially vertical position to, likewise, move the stack from a horizontal to a vertical stack position, a movable supporting surface that is selectively locatable to support the stack as it is moved from the horizontal to the vertical stack position, and a cart having a stack supporting surface, the cart being movable to a position wherein the stack supporting surface of the cart is positioned substantially beneath the movable supporting surface of the table and wherein the stack supporting surface of the cart and the movable supporting surface of the table are constructed and arranged so that the stack can be transferred onto the stack supporting surface of the cart by moving the movable supporting surface of the table relative to the stack supporting surface of the cart.

2. A system as set forth in the system as set forth in claim 1 wherein the material comprises folded business forms.

3. The system as set forth in claim 1 wherein the material comprises cut sheets.

4. The system is set forth in claim 1 wherein the table includes a support structure for supporting the movable supporting surface in a position extending from the tabletop support surface into a path of travel of the material as it moves in a direction from the conveyor toward the table.

5. The system is set forth in claim 4 wherein the support structure is constructed and arranged to enable the movable supporting surface to be moved into and out of the extended position relative to the tabletop support surface.

6. The system is set forth in claim 5 wherein the support structure is constructed and arranged to enable the movable supporting surface to move to a position beneath the tabletop support surface and out of the path of travel of the material.

7. The system is set forth in claim 5 wherein the movable supporting surface is constructed and arranged to move out of a position for supporting the vertical stack when the table is located in the substantially vertical position to transfer the vertical stack onto the stack supporting surface of the cart.

8. The system is set forth in claim 1 wherein the movable backing surface is located on the tabletop support surface in a position adjacent the conveyor and further comprising a downstream backing surface located more remote from the conveyor than the movable supporting surface on the table top support surface.

9. A system is set forth in claim 1 wherein the stack supporting surface of the cart comprises a plurality of sections separated by a wall structure each for receiving a stack of the material.

* * * * *